United States Patent Office 2,745,882
Patented May 15, 1956

2,745,882

DEHYDRATIVE DISTILLATION FOR PREPARATION OF ALKALI METAL SALTS OF 2,4,6-TRIALKYLPHENOLS

Chauncey C. Hale, Cranford, N. J., assignor to Esso Research and Engineering Company, a corporation of Delaware No Drawing. Application February 5, 1953,
Serial No. 335,385

10 Claims. (Cl. 260—624)

This invention relates to a novel method for the preparation of alkali metal salts of hindered phenols.

It had long been thought that hindered phenols such as 2,6-di-tert.-butyl,4-methyl phenol did not react with alkali metal hydroxides to form the alkali metal salts.

It has now been found that alkali metal phenolates of hindered phenols can be prepared in quantitative amounts by an improved process using strong dehydrating conditions. The process comprises reacting an alkali metal hydroxide with a hindered phenol in the presence of an inert, organic liquid which azeotropes with water and thereby removes it from the reaction system. The reaction is accordingly driven towards completion, and the preparation of the phenolates consequently greatly facilitated.

The alkali metal phenolates, which are believed to be new chemicals, thus correspond to the formula

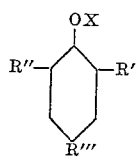

wherein R' and R" are alkyl groups which can be the same or different, R''' is a radical selected from the group consisting of hydrogen and alkyl radicals, and X is an alkali metal radical.

Those compounds wherein R' and R" are tertiary alkyl groups having from 4 to 16 carbon atoms and R''' is an alkyl group having from 1 to 6 carbon atoms are especially useful. Particularly effective and desirable compounds are the sodium and potassium salts of 2,6-di-tert.-butyl,4-methyl phenol.

Among the other particular phenols which can be used for the purpose of this invention are 2,4,6-trimethylphenol; 2,6-di-tert.-amyl-4-tert.-butyl-phenol; 2-tert.-butyl-4,6-di-methyl-phenol; 2,6-di-tert.-amyl-4-methyl-phenol; 2,6-di-tert.-butyl-4-cyclohexyl-phenol; and 3,5-di-tert.-butyl-4-hydroxy-diphenyl.

The hydroxides employed in the process of this invention are those of the alkali metals, i. e., the metals of group I-A of the periodic system, including lithium, sodium, and potassium. The sodium and potassium hydroxides actually, because of their lower costs, find greatest utility. The hydroxides can be employed in the solid or aqueous form. In being utilized in the solid form it is preferable that they be first finely divided. They can be utilized in the aqueous form conveniently in concentrations of about 40 weight per cent or higher. It is uneconomical to utilize aqueous concentrations of hydroxide containing less than about 40 weight per cent of the hydroxide.

The organic liquids employed to remove the water must be possessed of three distinct characteristics:

(1) They must form binary azeotropes with the water;
(2) They must be relatively insoluble in water so that the azeotrope "breaks" into two layers, a water layer and an organic liquid azeotroping agent layer; and (3) They do not undergo reaction with the alkali metal hydroxide, the phenol, or both.

All organic liquids which fit these criteria can be employed. It is desired that these liquids boil in the range of 50°–150° C., and preferably in the range of 60°–90° C. Especially preferred for utilization in this invention are the hydrocarbons boiling in these ranges such as hexane, heptane, xylene, benzene, cyclohexane, etc. These hydrocarbons can be aliphatic, aromatic, naphthenic, or mixtures of these. Halogenated hydrocarbons as well as dialkyl ethers, which can be mixed ethers, if available, can also be employed. The amount of organic liquid azeotroping agent employed is determined from two variables, the azeotropic composition formed and the amount of water present in the system which has to be removed. There also must be sufficient liquid, since the product as it forms will produce a thick suspension and thermal decomposition may occur in those areas receiving the external heat.

The method of carrying out the process of this invention is relatively simple. The reaction is carried out under fractional distillation conditions. When the components have been added, the mixture is heated up to the boiling point temperature of the azeotrope obtained. The reaction mixture is dehydrated by azeotropic distillation of the azeotroping liquid and water, and the reaction is thereby further driven to completion. The alkali hydroxide can thus be completely consumed in the reaction and the phenolate product obtained in excess organic azeotroping agent, the water having been driven off. If it is desired to obtain the phenolate itself as a solid product, it is conveniently obtained from the organic solvent solution by drum drying.

The reaction is preferably carried out in the presence of an inert atmosphere, e. g., nitrogen, to prevent oxidation.

This invention will be better understood by reference to the following examples of the preparation of an indicated phenolate according to the process of this invention.

EXAMPLE I

*Case in which 22% excess KOH in aqueous solution was used*

45 grams of 2,6-di-tert.-butyl,4-methyl phenol were added to 200 ml. of xylene, and 14 grams of potassium hydroxide, dissolved in the least amount of water possible, were also added. The mixture was stirred and heated in a distillation unit. Nitrogen was passed over the surface of the solution. A precipitate started to form, and increased as more water came off. The maximum amount of salt was precipitated as all the water was removed. The total contents of the distillation flask were transferred to centrifuging tubes and centrifuged. The excess xylene was decanted and a yield of 93.8% was obtained.

EXAMPLE II

*Case in which 22% excess of solid KOH was used*

45 grams of 2,6-di-tert.-butyl,4-methyl phenol and 14 grams of potassium hydroxide pellets were added to 250 ml. of xylene. This was heated and the water removed by azeotropic distillation. The yield of potassium phenolate obtained was 95.6%.

EXAMPLE III

*Case in which 64% excess of the phenol was used*

45 grams of 2,6-di-tert.-butyl,4-methyl phenol were added to 250 ml. of xylene and 7 grams of KOH pellets were also added. The water was removed by azeotropic distillation. After the last traces of water were removed, the total contents of the distillation flask were transferred to centrifuging tubes and centrifuged. The xylene was decanted off and petroleum ether mixed with the precipitate. The mixture was again centrifuged and the ether decanted. This was repeated a second time, after which the product was freed of ether by mild heat under a vacuum and stored under nitrogen. The yield based on the weight of product and the amount of water collected approximated 100%. This example was more successful than the two above, due in part to the use of a purer phenol sample and the use of improved techniques for the removal of the last traces of water. The purer product was obtained in this example, since excess of the phenol was removed in the petroleum ether washes and the completeness of the reaction insures the absence of free KOH.

The sodium salts of 2,6-di-tert.-butyl,4-methyl phenol were prepared in a similar manner as detailed above, except for the utilization of sodium hydroxide rather than potassium hydroxide.

The products of this invention, when made from a pure phenol and free of oxidation products, are white powdery solids. They are insoluble in the hydrocarbon type solvents, but undergo ready hydrolysis with water, giving back the alkali hydroxide and the phenol. They find possible utilization as lubricating oil agents wherein the last traces of acidity are desired to be neutralized with the simultaneous addition of an antioxidant. They are also extremely useful synthesis reagents, e. g., they are especially adapted for the preparation of esters and ethers of hindered phenols whose synthesis is otherwise difficult or impossible.

This invention has been described with respect to specific embodiments, but it is not intended to be limited thereby.

What is claimed is:

1. A process for preparing alkali metal phenolates corresponding to the formula

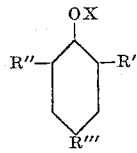

wherein R' and R'' are tertiary alkyl groups having from 4 to 16 carbon atoms, R''' is an alkyl group having from 1 to 6 carbon atoms, and X is an alkali metal radical, which comprises reacting an alkali metal hydroxide with the corresponding phenol in the presence of an inert, organic liquid, azeotroping agent which has a boiling point in the range of 50°–150° C., forms an azeotrope with water, and is relatively insoluble therein and removing water from the reaction mixture by heating the reaction mixture to a temperature at which an azeotrope of water and the azeotroping agent is distilled out.

2. The process of claim 1 in which the alkali metal phenolate is a sodium phenolate and the hydroxide is sodium hydroxide.

3. The process of claim 1 in which the alkali metal phenolate is a potassium phenolate and the hydroxide is potassium hydroxide.

4. The process of claim 1 in which the alkali metal phenolate is

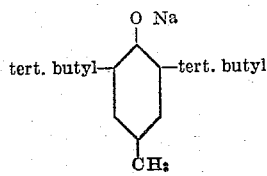

the phenol is 2,6-di-tert.-butyl,4-methyl phenol, and the hydroxide is sodium hydroxide.

5. The process of claim 1 in which the alkali metal phenolate is

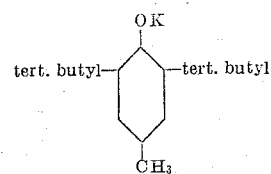

the phenol is 2,6-di-tert.-butyl,4-methyl phenol, and the hydroxide is potassium hydroxide.

6. A process for preparing

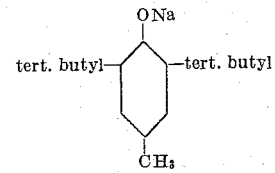

which comprises the steps of reacting 2,6-di-tert.-butyl,-4-methyl phenol with aqueous sodium hydroxide in the presence of xylene; dehydrating the resultant reaction mixture by azeotropic distillation to take overhead a distillate fraction of xylene and water; condensing this distillate fraction to obtain an aqueous layer and a xylene layer; separating the aqueous layer from the xylene layer; and returning the xylene layer to the reaction step.

7. A process for preparing alkali metal phenolates which comprises mixing an agent of the group consisting of solid alkali metal hydroxides and aqueous solutions of alkali metal hydroxides of at least 40 weight percent strength with a 2,6-di-tert.-alkyl-4-methyl phenol having 4 to 5 carbon atoms per alkyl group and with an inert liquid hydrocarbon which has a boiling point in the range of 50–150° C., forms an azeotrope with water, and is relatively insoluble therein, and dehydrating the mixture by heating it to the boiling point of the resulting azeotrope.

8. A process according to claim 7 wherein the reaction is carried out in the presence of an inert atmosphere.

9. A process according to claim 7 wherein the phenol is 2,6-di-tert.-butyl-4-methyl phenol, the hydrocarbon azeotroping agent is xylene and the hydroxide is added as solid sodium hydroxide.

10. A process for preparing alkali metal phenolates which comprises mixing an aqueous solution of an alkali metal hydroxide of at least 40 weight percent strength with an excess of 2,6-di-tert.-butyl-4-methyl phenol and an inert liquid hydrocarbon which has a boiling point in the range of 50–150° C., forms an azeotrope with water, and is relatively insoluble therein, dehydrating the mixture by heating it in an inert atmosphere to the boiling point of the resulting azeotrope, separating said liquid hydrocarbon from said reaction product, and washing the reaction product with petroleum ether to separate unreacted phenol therefrom.

References Cited in the file of this patent

UNITED STATES PATENTS

| | | |
|---|---|---|
| 2,202,877 | Stevens | June 4, 1940 |
| 2,248,828 | Stevens | July 8, 1941 |
| 2,529,209 | Ayo et al. | Nov. 7, 1950 |